Feb. 20, 1968    E. C. VITTOE    3,369,477
COFFEE-BREWING DEVICE
Filed May 13, 1965    3 Sheets-Sheet 1
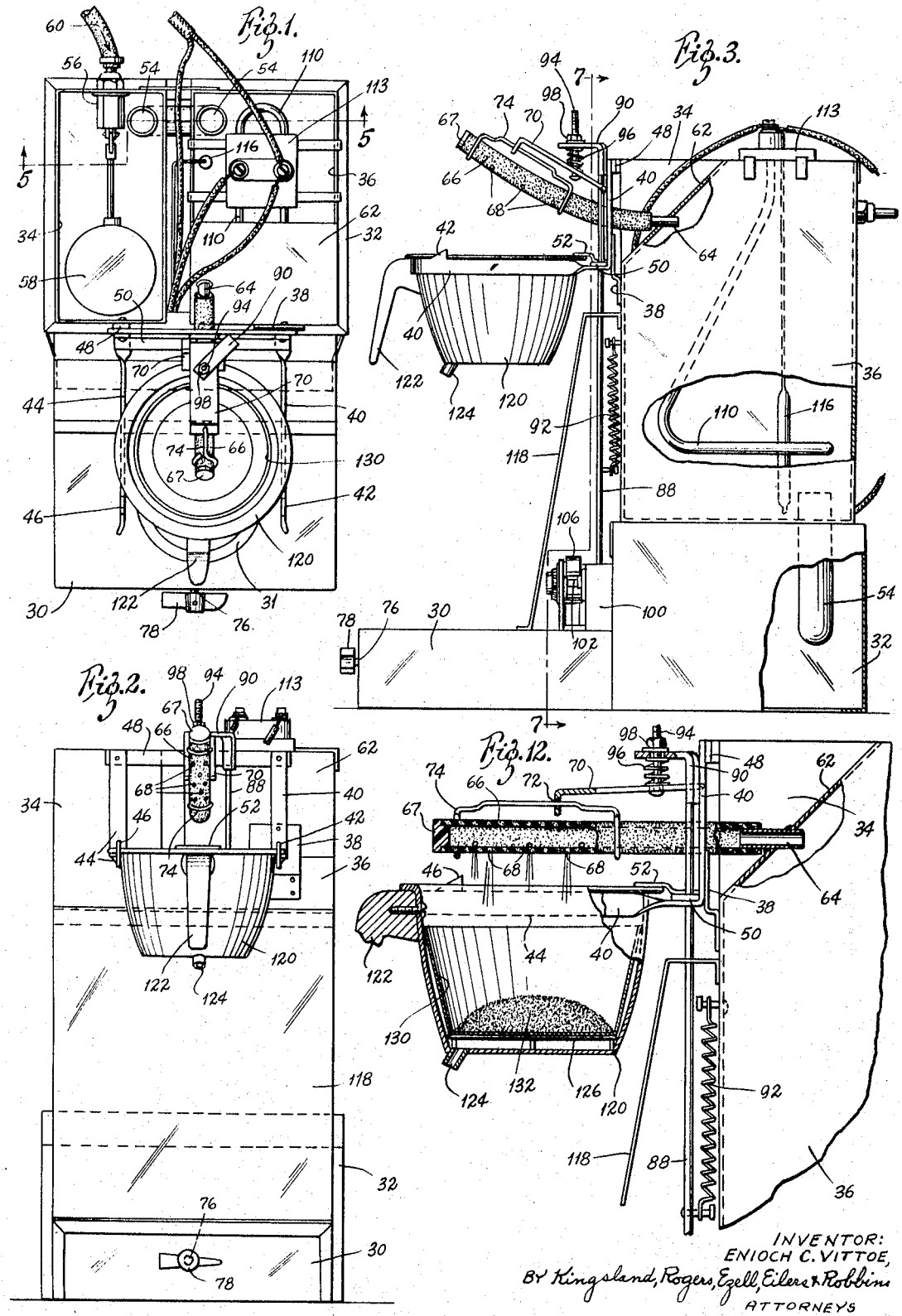
INVENTOR:
ENIOCH C. VITTOE,
BY Kingsland, Rogers, Ezell, Eilers & Robbins
ATTORNEYS Feb. 20, 1968                    E. C. VITTOE                    3,369,477
                              COFFEE-BREWING DEVICE
Filed May 13, 1965                                              3 Sheets-Sheet 2
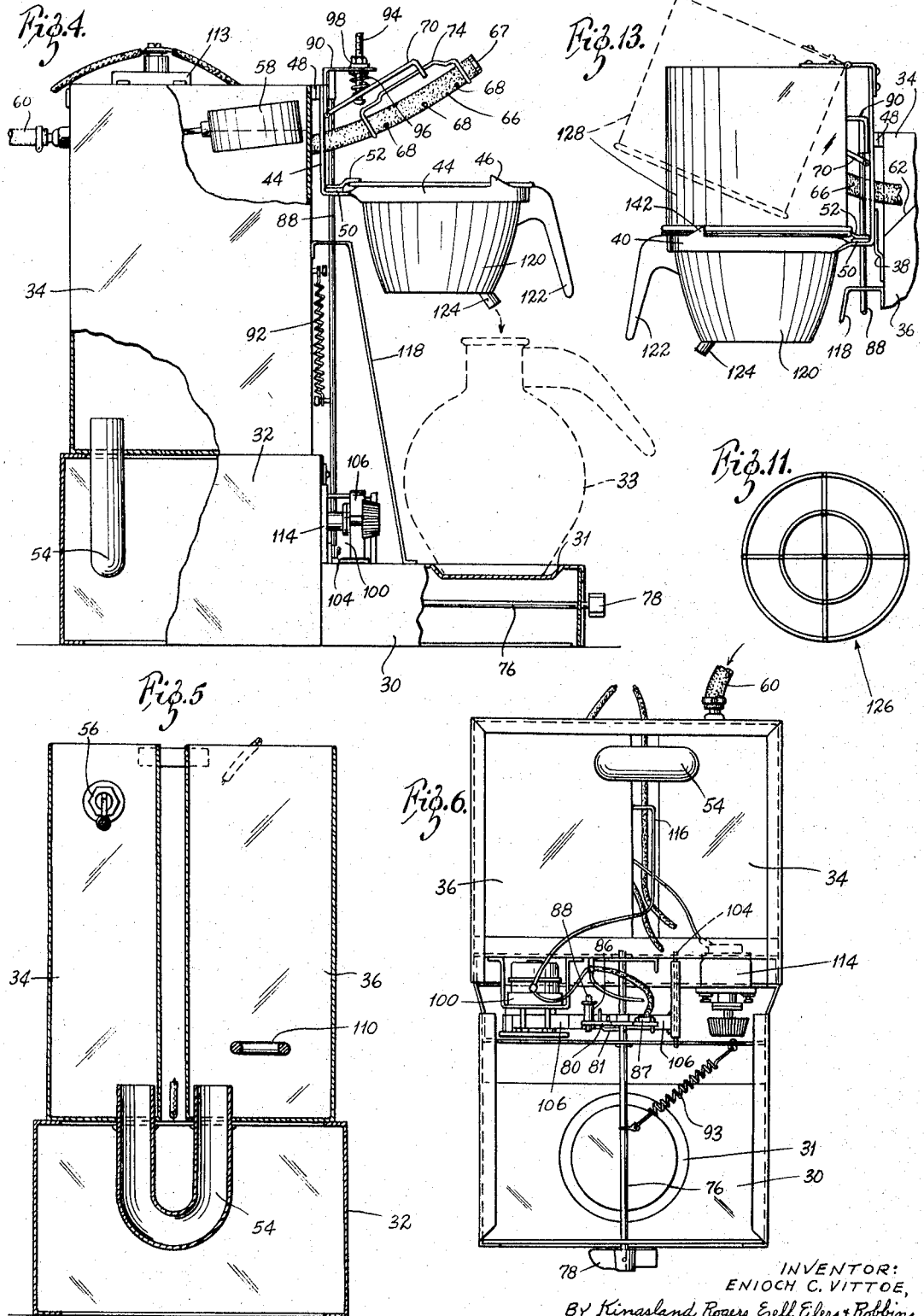
INVENTOR:
ENIOCH C. VITTOE,
BY Kingsland, Rogers, Ezell, Eilers & Robbins
ATTORNEYS

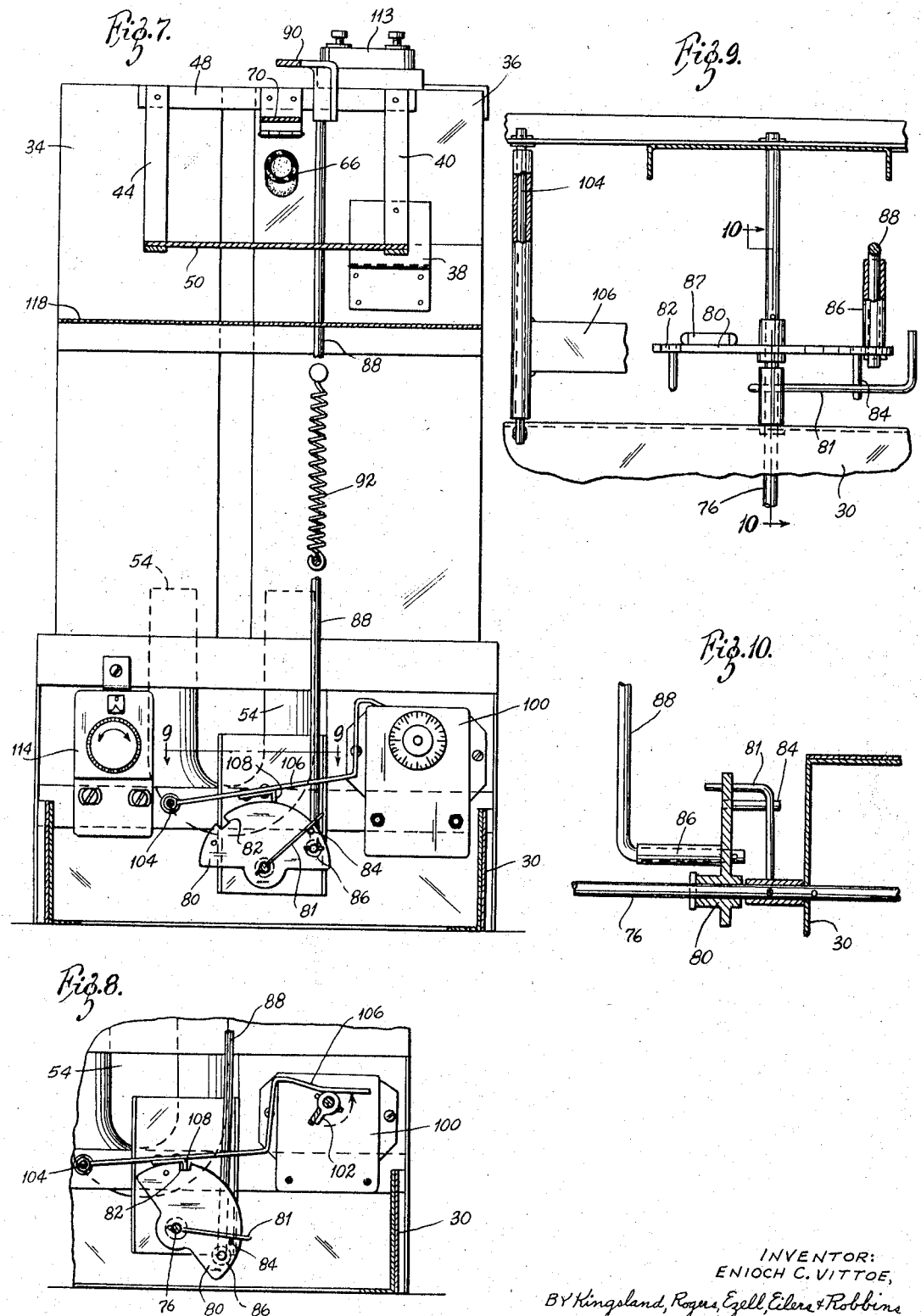

United States Patent Office 3,369,477
Patented Feb. 20, 1968

3,369,477
COFFEE-BREWING DEVICE
Enioch C. Vittoe, 1213 S. Pasfield Ave.,
Springfield, Ill. 62704
Filed May 13, 1965, Ser. No. 455,435
13 Claims. (Cl. 99—282)

ABSTRACT OF THE DISCLOSURE

A coffee-brewing device has a water-heating chamber, a cool water chamber that is connected to the water-heating chamber and that is connectable to a source of water, a float valve in the cool water chamber to control the water levels in that chamber and in the water-heating chamber, a thermostat in the water-heating chamber that is in the path of cool water entering that chamber so it can quickly initiate heating of the water in that chamber, a filter-receiving funnel that can hold coffee, and a flexible tube that is connected to the water-heating chamber and that can spray hot water onto the coffee in the filter-receiving funnel.

---

This invention relates to improvements in coffee-brewing devices. More particularly, this invention relates to improvements in coffee-brewing devices that can brew sizable quantities of coffee and then keep that coffee hot. It is, therefore, an object of the present invention to provide an improved coffee-brewing device that can brew a sizable quantity of coffee and then keep that coffee hot.

Coffee-brewing devices, that can brew sizable quantities of coffee and then keep that coffee hot, have been known for some time; and a number of those coffee-brewing devices have been used. Some of those coffee-brewing devices have utilized solenoid-operated water valves that had the inlet ports thereof connected to the local water supply and that had the outlet ports thereof connected to the water-heating tanks of those devices; and those solenoid-operated water valves were openable to introduce water into those tanks. Electric heaters in those water-heating tanks heated the water to coffee-brewing temperatures; and, whenever quantities of coffee were to be brewed, the solenoid-operated water valves were opened to introduce further water into those tanks—thereby raising the water levels in those tanks and causing the hot water to flow out through outlets adjacent the tops of those tanks. The solenoid-operated water valves remained open for predetermined periods of time, controlled by timing devices, and then closed—remaining closed until the next quantities of coffee were to be brewed.

The hot water in such coffee-brewing devices vaporizes continuously; and, where one of those devices is not used for several hours, the amount of hot water that is lost by vaporization can be great enough to appreciably reduce the amount of hot water that will be delivered from the water-heating tank of that device during the next coffee-brewing operation. The reduced amount of hot water available for that next coffee-brewing operation is objectionable, because it brews less coffee and also removes less of the flavorful components of the ground coffee. That reduced amount of hot water available for that next coffee-brewing operation also is objectionable, because it will be at a lower-than-usual temperature. The reduced level of water in the water-heating tank also is objectionable because it wastes power—by permitting heat from the electric heaters to be dissipated into the air in the water-heating tanks. If one of the said coffee-brewing devices is left inactive for many hours—over a holiday or week-end—the hot water in the water-heating tank of that device can vaporize so extensively that the electric heater becomes free of water, becomes overheated, and burns out. As a result coffee-brewing devices, that can brew sizable quantities of coffee and then keep that coffee hot, that use solenoid-operated water valves to introduce water into the water-heating tanks thereof are objectionable. It would be desirable to provide a coffee-brewing device, that could brew a sizable quantity of coffee and then keep that coffee hot, that did not require a solenoid-operated water valve to introduce water into the water-heating tank thereof. The present invention provides such a coffee-brewing device; and it does so by utilizing a cool water tank in addition to a water-heating tank, and by using a float valve to control the introduction of water into that cool water tank. That float valve will always keep the electric heater of that device fully immersed in water, irrespective of how long the coffee-brewing device is left inactive; and hence it will keep that electric heater from becoming free of water, from overheating, and from burning out. It is, therefore, an object of the present invention to provide a coffee-brewing device, that can brew a sizable quantity of coffee and then keep it hot, that has a cool water tank in addition to a water-heating tank, and that uses a float valve to control the introduction of water into that cool water tank.

The provision, in the coffee-brewing device of the present invention, of a cool water tank in addition to a water-heating tank is desirable, because it enables the warm air, in the room where that coffee-brewing device is located, to provide a pre-heating of the water to be used in brewing the coffee. The water that flows out of the taps and faucets of a building is usually cooler than the air within that building; and, where that water is introduced directly into the water-heating tank of a coffee-brewing device, heat must be used to raise the temperature of that water to the level of the temperaure of the air in that building, and then further heat must be used to raise the temperature of that water to the coffee-brewing level. Where the water is initially introduced into the cool water tank, as in the coffee-brewing device of the present invention, the warm air in the room where that device is located and the heat radiated from the water-heating tank of that device will pre-heat the water in the cool water tank. Consequently, the total cost and the total time for heating the water to coffee-brewing temperatures are reduced.

The water in the water-heating tank of the coffee-brewing device of the present invention is heated by submersion-type electric heaters; and a thermostat is provided to control the energization of those heaters. That thermostat has a temperature-sensitive bulk which is disposed within the water in the water-heating tank of that device. It is desirable, as soon as hot water is drawn from the water-heating tank of that device, to energize the electric heaters; because prompt energization of those electric heaters will help make the rest of the hot water drawn from that tank hot enough to effectively utilize the flavorful components of the coffee. Prompt energization of those electric heaters also is desirable to insure quick heating of the cool water which flows into the water-heating tank to replace the hot water that is drawn off. The present invention initiates prompt energization of the electric heaters, whenever hot water is drawn from the water-heating tank, by using a float valve to control the introduction of water into the cool water tank, by forming the upper portion of the water-heating tank so the withdrawal of even small amounts of water from that water-heating tank will quickly lower the level of the water in that water-heating tank and hence in the cool water tank, and by providing a connection between the cool water tank and the water-heating tank which will direct the cool water from the cool water tank toward the temperature-sensitive bulb of the thermostat. With this arrangement, cool water will flow into the water-heating tank as soon as hot water is drawn from that tank, and that cool water will be directed toward the temperature-sensitive bulb of the thermostat; and that bulb will respond to that cool water to cause the thermostat to energize the electric heaters. As a result, the electric heaters of the coffee-brewing device provided by the present invention will be energized as soon as hot water is drawn from the water-heating tank of that device. It is, therefore, an object of the present invention to provide a coffee-brewing device with a float valve to control the introduction of water into a cool water tank, to form the upper portion of the water-heating tank so the withdrawal of even small amounts of water from that water-heating tank will quickly lower the level of the water in that water-heating tank and hence in the cool water tank, and to provide a connection between the cool water tank and the water-heating tank which will direct the cool water from the cool water tank toward the temperature-sensitive bulb of a thermostat.

The water pressures of local water supplies vary from locality to locality; and those varied water pressures tend to uncontrollably vary the rates at which hot water is delivered to the ground coffee in coffee-brewing devices that can brew sizable quantities of coffee and then keep that coffee hot. Any uncontrolled variations in the rates at which hot water is delivered to the ground coffee in coffee-brewing devices, that can brew sizable quantities of coffee and then keep that coffee hot, is objectionable; because those variations uncontrollably vary the volume and strength of the brewed coffee. Flow-controlling valves have been used in coffee-brewing devices, that can brew sizable quantities of coffee and then keep that coffee hot, in an effort to minimize the uncontrolled variations in the rates at which hot water is delivered to the ground coffee in those coffee-brewing devices; but flow-controlling valves tend to "lime" up. All "liming" up of such valves is objectionable, because it decreases the amounts of water that can flow through those valves during any given period of time. Consequently, it would be desirable to provide a coffee-brewing device, that could brew sizable quantities of coffee and then keep that coffee hot, that did not require a flow-controlling valve. The present invention provides such a coffee-brewing device; and it does so by providing a vertically-movable water-distributing spray that coacts with the float valve to substantially eliminate variations in the rates at which hot water is delivered to the ground coffee. The float valve maintains closely controlled levels of water within the cool water tank and within the water-heating tank; and the vertically-movable water-distributing spray is normally held above those levels, to hold the hot water within the water-heating tank, but is selectively lowered to a position below those levels, to permit that hot water to spray onto the ground coffee. When that vertically-movable water-distributing spray is in its lowered position, it coacts with the float valve to establish a closely controlled hydraulic head; and that hydraulic head causes the hot water to spray onto the ground coffee at a controlled and uniform rate. It is, therefore, an object of the present invention to provide a coffee-brewing device, that can brew sizable quantities of coffee and then keep that coffee hot, that has a vertically-movable water-distributing spray and a float valve.

The vertically-movable water-distributing spray of the present invention is used in lieu of one of the spray nozzles customarily used in coffee-brewing devices that brew sizable quantities of coffee and then keep that coffee hot. This is desirable; because that vertically-movable water-distributing spray is resistant to "liming" up, whereas those spray nozzles are not, and because that vertically-movable water-distributing spray is readily cleaned, whereas those spray nozzles are not. Specifically, that vertically-movable water-distributing spray is made as a perforated length of flexible tubing with a removable plug in the free end thereof; and the material of which that vertically-movable water-distributing spray is made is highly resistant to "liming" up. Moreover, the flexible nature of the material of which that vertically-movable water-distributing spray is made coacts with the removable plug in the free end of that vertically-movable water-distributing spray to make it very easy to clean that vertically-movable water-distributing spray. It is, therefore, an object of the present invention to provide a vertically-movable water-distributing spray that is made as a perforated length of flexible tubing with a removable plug in the free end thereof.

The lowered position of the vertically-movable water-distributing spray, provided by the present invention, can be adjusted; and hence the rate at which the hot water is sprayed onto the ground coffee can be adjusted. This is desirable; because different grinds and kinds of coffee should have hot water sprayed onto them at different rates. It is, therefore, an object of the present invention to provide a coffee-brewing device wherein the lowered position of the vertically-movable water-distributing spray can be adjusted to adjust the rate at which hot water is applied to the ground coffee.

The vertically-movable water-distributing spray of the present invention is moved down to its lowered position, and then is held in that position, by a mechanism which is controlled by a timer. That timer has an adjustable cycle; and this means that both the rate of application and the duration of application of hot water to the ground coffee are adjustable. As a result, the coffee-brewing device provided by the present invention can easily accommodate many different grinds and kinds of coffee. It is, therefore, an object of the present invention to provide a coffee-brewing device, that can brew sizable quantities of coffee and then keep that coffee hot, that can adjust the lowered position of the vertically-movable water-distributing spray thereof, and that can adjust the length of time during which that vertically-movable water-distributing spray applies hot water to the ground coffee.

The mechanism that moves the vertically-movable water-distributing spray down to its lowered position has a manually-operable release which enables that vertically-movable water-distributing spray to be moved down into and held in that lowered position and then moved back up to its normal position independently of the timer. This is desirable; because it enables the coffee-brewing device of the present invention to provide any desired quantities of hot water for brewing tea or for making hot chocolate. Further, this is desirable, because it enables the operator of that coffee-brewing device to make even very small quantities of coffee, if she so desires. It is, therefore, an object of the present invention to provide a coffee-brewing device wherein the positioning of the vertically-movable water-distributing spray is normally controlled by a timer but can be selectively controlled by a mechanism which has a manually-operable release.

In the coffee-brewing devices that brew sizable quantities of coffee and then keep that coffee hot, the ground coffee is customarily held within a filter, and that filter is customarily held within a funnel. During the brewing of the coffee, hot water is directed onto the ground coffee, and the resulting brewed coffee flows freely through the filter to the spout of the funnel and thence into a dispensing container. While most of the brewed coffee promptly flows out of that funnel and into that container, some small amounts of brewed coffee tend to remain within that funnel and then drip from the spout of that funnel as that funnel is removed from the coffee-brewing device to facilitate the removal and disposal of the filter and the spent coffee grounds. All such dripping is objectionable; and the present invention prevents such dripping by disposing the spout of the funnel adjacent that side of the funnel which bears the handle, and by providing projections on the supports for that funnel which force the operator to tilt that funnel as she withdraws that funnel from its position beneath the vertically-movable water-distributing spray. The enforced tilting of that funnel will force any residual brewed coffee within that funnel to flow away from the spout; and hence that brewed coffee will not be able to drip from that spout as that funnel is removed from the coffee-brewing device. It is, therefore, an object of the present invention to provide a funnel, for a coffee-brewing device, which has the spout thereof located adjacent the handle thereof, and to provide projections on the funnel-supporting portions of that device which force that funnel to tilt and raise the spout thereof upwardly as that funnel is removed from that device.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing:

FIG. 1 is a plan view of one embodiment of coffee-brewing device that is made in accordance with the principles and teachings of the present invention, as that device appears when the tops of the tanks and the hinged cover have been removed, the tops of course being vented to atmosphere as will appear from the following description, FIG. 2 is a front elevational view of the coffee-brewing device shown in FIG. 1, FIG. 3 is a partially broken-away, partially sectioned view of the right-hand side of the coffee-brewing device of FIG. 1, FIG. 4 is a partially broken-away, partially sectioned view of the left-hand side of the coffee-brewing device of FIG. 1, FIG. 5 is a vertical secaion through the coffee-brewing device of FIG. 1, and it is taken along the broken plane indicated by the broken line 5—5 in FIG. 1, FIG. 6 is a bottom plan view of the coffee-brewing device of FIG. 1, FIG. 7 is a vertical section, on a larger scale, that is taken approximately along the line 7—7 in FIG. 3, but the conductors have been deleted, FIG. 8 is a vertical section, on the scale of FIG. 7, of part of the actuating mechanism of the coffee-brewing device of FIG. 1, and it is taken approximately along the line 7—7 in FIG. 3, FIG. 9 is a partially broken-away section through the coffee-brewing device of FIG. 1, and it is taken along the line 9—9 in FIG. 7, and it is on a still larger scale, FIG. 10 is another sectional view through the coffee-brewing device of FIG. 1, and it is taken along the line 10—10 in FIG. 9, FIG. 11 is a plan view of the grid used in the funnel of the coffee-brewing device of FIG. 1, FIG. 12 is a partially broken-away, partially-sectioned view, on a scale intermediate those of FIGS. 1 and 7, showing the water-distributing spray in its lowered position, and FIG. 13 is an elevational view of the right-hand side of the hinged cover for the coffee-brewing device of FIG. 1.

*Components of coffee-brewing device*

Referring to the drawing in detail, the numeral 30 denotes a platform for one preferred embodiment of coffee-brewing device that is made in accordance with the principles and teachings of the present invention. That platform is hollow, and the top thereof has a circular opening 31 in which an electric heating element of standard and usual design is disposed. That electric heating element will underlie a conventional container 33 for brewed coffee, and it will keep that container and the brewed coffee therein at a desired temperature.

Disposed rearwardly of the platform 30, and connected thereto, is a base 32. That base is hollow; and, as shown particularly by FIGS. 2–4, it is more than twice as high as the platform 30. A cool water tank 34 is secured to, and extends upwardly from, the base 32; and a water-heating tank 36 also is secured to, and extends upwardly from, that base. The water tanks 34 and 36 are close to each other, as shown particularly by FIGS. 1 and 5. Also as shown by FIGS. 1 and 5, the tank 34 is smaller than the tank 36. If desired, the exterior of the water-heating tank 36 could be encased within a sheath of insulation.

A bracket 38, which has an offset intermediate the top and bottom thereof, is secured to the front of the tank 36 adjacent the top of that tank. The offset in that bracket disposes the upper portion of that bracket forwardly of the rear portion of that bracket; and the rear portion of that bracket is secured to the front of the tank 36. An L-shaped bracket 40 is bent so the upwardly-extending upper arm thereof is parallel to the upper portion of the bracket 38, and so the horizontally-directed lower arm thereof has its narrow edges at the top and bottom thereof. The upwardly-extending upper arm of that bracket is fixedly secured to the bracket 38, and thus to the front of the water-heating tank 36. The free end of the horizontally-directed lower arm is bent outwardly; and a projection 42 is formed on the upper edge of that horizontally-directed lower arm close to the free end of that arm. That projection has an abrupt, vertically-directed rear face and has an inclined front face. The numeral 44 denotes a generally similar L-shaped bracket; and the upwardly-extending rear arm of that bracket is secured to the front face of the cool water tank 34. The horizontally-directed lower arm of the bracket 44 has the free end thereof bent outwardly; and hence that free end coacts with the free end of the horizontally-directed lower arm of the L-shaped bracket 40 to constitute converging guides for the funnel 120 of the coffee-brewing device. A projection 46 is formed on the upper surface of the horizontally-directed lower arm of the L-shaped bracket 44; and that projection is substantially identical to the projection 42 on the horizontally-directed lower arm of the L-shaped bracket 40. A bar 48 extends horizontally between and interconnects the upper ends of the upwardly-extending upper arms of the L-shaped brackets 40 and 44. A bar 50 extends horizontally between and interconnects the rear ends of the horizontally-directed lower arms of the L-shaped brackets 40 and 44. A stop 52 is secured to the bar 50, adjacent the center of that bar; and that stop extends forwardly a short distance from that bar. That stop has an offset therein, so the forward-most end of that stop is disposed above the level of the bar 50.

The numeral 54 denotes a U-shaped conduit which has the upper end of one arm thereof extending upwardly through the bottom of the cool water tank 34, and which has the upper end of the other arm thereof extending upwardly through the bottom of the water-heating tank 36. In the said preferred embodiment of the present invention, the upper ends of the arms of the U-shaped conduit 54 extend about one inch above the inner surfaces of the bottoms of the tanks 34 and 36. That U-shaped conduit enables the water within the tanks 34 and 36 to have the same level; but the disposition of the upper ends of the arms of that conduit about one inch above the inner surfaces of the bottoms of those tanks minimizes any tendency of the hot water in the tank 36 to pass through that conduit and enter the tank 34. Also, the disposition of the upper end of the right-hand arm of the conduit 54, as that conduit is viewed in FIG. 5, about one inch above the inner surface of the tank 36, causes the water entering that tank to tend to move upwardly.

The numeral 56 denotes a float-operated inlet valve which is located adjacent the top of the rear wall of the cool water tank 34. A float 58 is suitably connected to the movable element of that valve by an arm; and that float will permit that valve to open whenever the water level in the tank 34 falls below a predetermined level. A hose 60 is connected to the inlet port of the valve 56, and that hose is readily connectable to a faucet or other pipe fitting of the local water supply.

The numeral 62 denotes the upper portion of the front wall of the tank 36; and that upper portion inclines upwardly and rearwardly, as shown by FIG. 3. That upper portion of that front wall reduces the volume of water which can be held within the upper part of the tank 36. This is desirable; because it makes certain that the level of water in the tank 36 will drop quickly whenever hot water is drawn from that tank. As the level of the water in the tank 36 drops quickly, the level of the water in the tank 34 also will drop quicky; and, consequently, the inlet valve 56 will open promptly. The resulting prompt introduction of cool water into the tank 36 by the right-hand arm of the U-shaped conduit 54 will cause cool water to quickly contact the temperature-sensitive bulb 116 of the thermostat 114.

The numeral 64 denotes a pipe nipple which is secured to the upper portion 62 of the front wall of the tank 36 in a water-tight connection. The numeral 66 denotes the water-distributing spray provided by the present invention; and that spray preferably is a length of flexible tubing which has one end thereof telescoped over the free end of the nipple 64 in water-tight fashion. The outer end of the water-distributing spray 64 is normally closed by a removable plug 67. A number of openings 68 are formed in the underface of the water-distributing spray 66, and those openings are spaced both axially and circumferentially of that water-distributing spray. However, all of the openings 68 are formed so they are directed downwardly rather than horizontally or upwardly.

The numeral 70 denotes a lever which has one end thereof secured to the bar 48 by a hinge, and which has the free end thereof bent downwardly to give that lever a generally L-shaped configuration. An opening 72 is formed in the downwardly-bent end of the lever 70; and that opening freely accommodates a wire-like support 74. The ends of that wire-like support are formed into loops; and those loops are telescoped over the water-distributing spray 66. One of those loops is located closely adjacent the free end of the water-distributing spray 66, while the other of those loops is located a short distance forwardly of the upwardly-extending upper arms of the L-shaped brackets 40 and 44. The opening 72 in the downwardly-bent free end of the lever 70 coacts with the wire-like support 74 to permit the free end of the water-distributing spray to be moved easily between the normal raised position shown by FIGS. 2–4, and the lowered position shown by FIG. 12. Whenever the water-distributing spray 66 is in its normal raised position, all of the openings 68 in that spray are disposed above the water level maintained in the tanks 34 and 36 by the float-operated inlet valve 56; and hence no water will flow outwardly through those openings. However, whenever the water-distributing spray 66 is in its lowered position, all of the openings 68 in that spray are disposed below the level of the water in the tank 36; and hence water will fill that spray and flow outwardly through those openings. The float-operated inlet valve 56 will closely control the level of water in the tanks 34 and 36; and hence, whenever the water-distributing spray 66 is in its lowered position, a closely controlled hydraulic head will be applied to the water within that spray. That closely controlled hydrauic head will cause hot water to flow outwardly through the openings 68 at a uniform rate, irrespective of whether the pressure of the local water supply is high or low.

The numeral 76 denotes an elongated shaft which has the front end thereof journaled in the platform 30 and which has the rear end thereof journaled in the base 32. The front end of that shaft projects forwardly beyond the front of the platform 30, and a knob 78 is secured to that front end. A generally circular disk 80 is loosely mounted on the shaft 76, adjacent the rear end of that shaft, so that shaft can be rotated relative to that disk. An L-shaped arm 81 is fixedly secured to the shaft 76, at a point immediately forward of the disk 80; and the shank of that arm extends radially outwardly from that shaft, while the foot of that arm extends axially toward the rear end of that shaft. The shank of that L-shaped arm is long enough so the foot of that arm is disposed radially outwardly beyond the periphery of that disk. As indicated by FIG. 7, the foot of the arm 81 overlies the periphery of the disk 80. A generally-rectangular notch 82 is formed in the periphery of the disk 80; and an ear 84 is formed on the disk 80 so it projects forwardly from the plane of the front face of that disk. As indicated by FIG. 7, the ear 84 is spaced more than one hundred and twenty degrees away from the notch 82. A sleeve 86 extends rearwardly from the rear face of the disk 80; and that sleeve is spaced just a few degrees from the ear 84. A mercury switch 87 is secured to the rear face of the disk 80, as shown by FIG. 6; and, whenever that disk is in a position where the notch 82 is at the top of that disk, the mercury in the switch 87 will bridge the contacts of that switch. Whenever the mercury in that switch is spaced away from the contacts of that switch, the notch 82 in that disk will be spaced away from the top of that disk.

A connecting rod 88 has the lower end thereof secured within the sleeve 86 carried by the disk 80; and that rod extends upwardly through an opening in the bar 50. That opening and the sleeve 86 guide and confine the connecting rod 88 while permitting substantially free vertical movement of that rod. The numeral 90 denotes an L-shaped bracket which is secured to the upper end of the connecting rod 88; and the front of that L-shaped bracket extends forwardly from the connecting rod 88 to overlie part of the lever 70. A helical extension spring 92 is secured to the connecting rod 88 and also to the water-heating tank 36. That helical extension spring biases the L-shaped bracket 90 upwardly and also biases the disk 80 for rotation in the counter clockwise direction in FIG. 7. A helical extension spring 93 is secured to a pin in the shaft 76 and also to the platform 30. That helical extension spring biases the shaft 76 for rotation in the clockwise direction in FIG. 7.

A bolt 94 extends through an opening in the lever 70 and also extends through an opening in the foot of the L-shaped bracket 90; and the head of that bolt underlies and supports the lever 70. A helical compression spring 96 encircles the shank of the bolt 94, and a washer and a nut 98 are fitted onto the shank of that bolt above the level of the foot of the L-shaped bracket 90. The nut 98 can be rotated relative to the shank of the bolt 94 to adjust the normal spacing between the lever 70 and the foot of the L-shaped bracket 90. That spacing will determine the normal position of the water-distributing spray.

The numeral 100 denotes an electrically-driven, adjustable timer which is mounted on the base 32 adjacent the rear of the platform 30; and that timer has a releasing cam 102. The mercury switch 87 is connected to and controls the energization of the timer 100. The numeral 104 denotes a pivot which is secured to the platform 30 and to the base 32, and that pivot is horizontally-directed. A latch 106 has a hub at one end rotatably held by the pivot 104; and the other end of that latch overlies and is engageable by the releasing cam 102 of the timer 100. A catch 108 is provided on the under face of the latch 106; and that catch is dimensioned to extend into the notch 82 in the periphery of the disk 80 to hold that disk against rotation.

The numeral 110 denotes a submersion-type electric heater, and a mounting block 113 secures the upper end of that electric heater to the water-heating tank 36. The lower end of that heater extends downwardly into that tank and extends close to the bottom of the tank. While just one heater has been shown, a plurality of electric heaters is preferable. Also, while a bent electric heater is shown, straight electric heaters are very useful. The thermostat 114, which is used to control the power supplied to the electric heater 110, has the temperature-sensitive bulb 116 thereof adjacent to the U-shaped conduit 54. The thermostat 114 is of the adjustable type; and it is mounted on the base 32 adjacent the rear of the platform 30. That thermostat can be set to establish different temperature levels for the water within the water-heating tank 36.

A removable cover plate 118 is normally set in position adjacent the rear of the platform 30 and adjacent the front of the base 32. That removable cover plate will provide an attractive and utilitarian appearance for the front of the base 32 and will also keep unauthorized persons from changing the temperature setting of the thermostat 114 and from changing the length of the cycle of the timer 100.

The funnel 120 has a generally flat bottom and has generally frusto-conical sides. The diameter of the bottom of that funnel is smaller than the diameter of the top of that funnel; and the top of that funnel has an outwardly-extending flange. The top of that funnel is dimensioned to fit freely between the confronting faces of the horizontally-directed lower arms of the L-shaped brackets 40 and 44, but the outwardly-extending flange on that top is dimensioned to project outwardly beyond, and to overlie and to be supported by, those horizontally-directed arms. The outwardly-extending flange at the top of the funnel 120 is dimensioned to fit under the upwardly-offset portion of the stop 52. That stop will coact with the horizontally-directed arms of the L-shaped brackets 40 and 44 to prevent accidental tilting of the funnel 120 relative to those horizontally-directed arms.

A handle 122, of standard and usual configuration, is provided for the funnel 120; and that handle can be grasped by the user of the coffee-brewing device to dispose that funnel in position atop the horizontally-directed arms of the L-shaped brackets 40 and 44 and to remove that funnel from that position. A spout 124 is provided for the funnel 120; and that spout is spaced away from the geometric center of the bottom of that funnel. Specifically, that spout is located adjacent that portion of the bottom of the funnel 120 which is close to the handle 122. A grid 126 is disposed within the funnel 120; and that grid will normally be disposed a short distance above the upper face of the bottom of that funnel. However, that grid can easily be moved away from that upper face for cleaning purposes.

The numeral 128 denotes a cover which is suitably hinged to the upwardly-extending upper arms of the L-shaped brackets 40 and 44. That cover has a recess therein which normally telescopes down over, and conceals, the water-distributing spray 66. That cover normally overlies the funnel 120 whenever that funnel is in position atop the horizontally-directed arms of the L-shaped brackets 40 and 44. However, that cover can be rotated upwardly to facilitate the adjustment, cleaning or replacement of the components which it normally conceals.

*Operation of coffee-brewing device*

Whenever the coffee-brewing device provided by the present invention is to be installed in a restaurant, hotel, or other place, the hose 60 will be connected to a faucet or other fitting of the water system; and water will then enter the cool water tank 34 through the float-operated inlet valve 56. A suitable cover, not shown, will be provided for the cool water tank 34. As water enters the cool water tank 34, that water will pass downwardly into the U-shaped conduit 54 and then rise upwardly in the water-heating tank 36. When the level of the water in both tanks is high enough to raise the float 58 far enough to shut off the float-operated inlet valve 56, further introduction of water into the cool water tank 34 will be prevented. At such time, the conductors which are connected to the electric heater 110 via the thermostat 114 will be inserted in a suitable receptacle. Thereupon, that electric heater will start heating the water in the water-heating tank 36; and that electric heater will continue to heat that water until the temperature of that water reaches the desired value. At such time, the thermostat 114 will de-energize that electric heater; but it will immediately re-energize that electric heater whenever the temperature of the water adjacent the temperature-sensitive bulb 116 falls below a second predetermined level.

When the temperature of the water in the water-heating tank 36 reaches the desired level, the user can insert a filter 130 within the funnel 120 and can then pour the desired amount of ground coffee 132 onto that filter. Thereafter, the user will move that funnel into register with the space defined by the horizontally-directed arms of the L-shaped brackets 40 and 44, and will then move the flange at the top of that funnel into engagement with the inclined front faces of the projections 42 and 46 on those arms. Those inclined faces will guide the flange at the top of the funnel 120 upwardly over those projections. As that flange is forced upwardly over those projections, it will engage the cover 128 and force that cover to rotate upwardly far enough to enable that flange to pass over those projections. Once that flange has passed rearwardly of those projections, that flange will move downwardly and come to rest upon the upper edges of the horizontally-directed arms of the L-shaped brackets 40 and 44; and, at that time, the cover 128 will move downwardly and rest upon that flange.

The operator can then grasp the knob 78 and rotate that knob in the clockwise direction in FIG. 2; and, as that knob is so rotated, the L-shaped arm 81 thereon will move into engagement with the forwardly extending ear 84 on the disk 80 and force that disk to rotate in the clockwise direction. That rotation will move the notch 82 from the initial position shown by FIG. 7 toward the latching position shown by FIG. 8; and it will cause the sleeve 86 and the connecting rod 88 to pull the L-shaped bracket 90 downwardly and thereby permit the water-distributing spray 66 to move to the lowered position shown by FIG. 12, while also causing the mercury switch 87 to complete the circuit to the timer 100. As the water-distributing spray is moved to the lowered position shown by FIG. 12, hot water will flow through the nipple 64 into that spray, and will then flow through the openings 68 and spray onto the ground coffee 132 held by the filter 130 within the funnel 120. That hot water will brew the coffee, and the brewed coffee will then drain from the spout 124 of the funnel 120 into the container 33 which underlies that spout.

As the hot water flows outwardly through the nipple 64 and then through the water-distributing spray 66, the level of the water in the water-heating tank 36 will quickly drop—because of the inclination of the upper portion 62 of the front of the wall of that tank—and water from the cool water tank 34 will pass through the U-shaped conduit 54 and reduce the temperature of the water adjacent the temperature-sensitive bulb 116 of the thermostat 114. That bulb will quickly close the contacts of that thermostat to supply power to the electric heater 110; and this is desirable because it makes certain that the water flowing out through the nipple 64 and the water-distributing spray 66 is quite hot, and also assures prompt heating of the cooler water which enters the bottom of the water-heating tank 36 and rises upwardly in that tank as the hot water is drawn off through the nipple 64. The float-operated inlet valve 56 will permit enough water to enter the cool water tank 34 to replenish the water that is drawn out of the water-heating tank 36 through the nipple 64 and the water-distributing spray 66.

The hot water will continue to flow from the openings 68 in the water-distributing spray 66 throughout the cycle of the timer 100; but, when that timer reaches the end of its cycle, the releasing cam 102 will engage and raise the free end of the latch 106. As that free end is raised, the catch 108 on the bottom of that latch will be raised upwardly out of the notch 82 in the disk 80. Thereupon, the helical extension spring 92 will raise the connecting rod 88 upwardly—thereby raising the lever 70 and the water-distributing spray 66 to the raised position shown by FIGS. 2–4. Thereupon, no further hot water will be able to pass outwardly through the nipple 64 and the water-distributing spray 66. That helical extension spring 92 also will rotate the disk 80 in the counter clockwise direction in FIG. 8—thus causing the ear 84 to rotate the shaft 76 in the counter clockwise direction and also shifting the mercury switch 87 to a position where the mercury no longer bridges the contacts of that switch. At that time the timer 100 becomes de-energized and automatically restores itself to its normal position. The normal cycle provided by the timer 100 is approximately three minutes; but that cycle can be lengthened or shortened as desired.

The electric heater 110 will continue to heat the water within the water-heating tank 36 until that water reaches the desired temperature. Thereupon, the thermostat 114 will de-energize that heater until such time as the temperature of the water adjacent the temperature-sensing bulb 116 thereof again falls below the desired level.

After the brewed coffee has passed from the funnel 120 into the container 130, and that happens very quickly, the operator will want to remove the funnel 120 with its filter and spent coffee grounds. In doing so, she will grasp the handle 122 of the funnel 120 and pull it toward her. However, she will be unable to pull that funnel straight out from its position atop the horizontally-directed arms of the L-shaped brackets 40 and 44, because the rear faces of the projections 42 and 46 will lie in the path of the flange at the top of that funnel and because those rear faces are vertically-directed. Consequently, to remove the funnel 120 from its position atop the horizontally-directed arms of the L-shaped brackets 40 and 44, the operator must raise upwardly on the handle 122 and guide the flange at the top of that funnel over the projections 42 and 46; and the raising of that handle is important, because it forces the residual brewed coffee within the funnel 120 to move away from the spout 124. If the operator then holds that funnel so the side opposite the handle is lower than the side to which that handle is attached, that operator can carry the funnel 120 without permitting any brewed coffee to drip from the spout 124. As the flange at the top of the funnel 120 is forced to move upwardly to pass over the projections 42 and 46, the cover 128 will rotate upwardly to permit that flange to move upwardly.

After the filter and the spent coffee grounds have been emptied from the funnel 120, the grid 126 within that funnel will be suitably cleaned. Thereafter, a further filter 130 and a further quantity of ground coffee 132 will be disposed within the funnel 120; and that funnel will be returned to its position atop the horizontally-directed arms of the L-shaped brackets 40 and 41.

It will be noted that the only valve in the water system of the coffee-brewing device provided by the present invention is the float-operated inlet valve 56. That valve is never contacted by hot water, and hence it will have little or no tendency to "lime" up. Further, the rate of flow of water through that valve is not critical; and hence that valve will seldom require cleaning and will rarely, if ever, need to be replaced.

Hot water does flow through the water-distributing spray 66 and through the water-distributing openings 68 therein. However, because that water-distributing openings 68 therein. However, because that water-distributing spray is made of a flexible material, which is highly resistant to "liming," most coffee-brewing devices that are made in accordance with the principles and teachings of the present invention will experience little or no "liming" of the water-distributing spray. However, in areas where the water is unusually "hard," liming of that water-distributing spray may occur; but the deposits of lime can easily be removed from that spray by removing the plug 67 in the free end of that spray and forcing a stiff brush through that spray and by then forcing smaller stiff brushes through the openings 68 in that spray. As a result, the coffee-brewing device provided by the present invention is substantially, if not completely, free from the lime-induced service calls and replacement costs experienced with many coffee-brewing devices which brew substantial quantities of coffee and then keep that coffee hot.

The water within the water-heating tank 36 will be kept at an elevated temperature, and will thus tend to vaporize. Even where the water in the water-heating tank 36 is kept hot for long periods of time, that water cannot vaporize to the extent that it exposes the surfaces of the heater 110; because the float-operated inlet valve 56 will always keep the level of the water in the water-heating tank 36 high enough to completely immerse that electric heater. Consequently, the coffee-brewing device provided by the present invention is free from the service calls and replacement costs due to the burning out of electric heaters, that is experienced in many coffee-brewing devices which make large quantities of coffee and then keep that coffee hot.

To increase the rate at which the hot water flows outwardly through the openings 68 in the water-distributing spray 66, it is only necessary to rotate the nut 98 to lower the initial position of the lever 70 and thus lower the initial position of the water-distributing spray 66. The lowering of those initial positions provides a corresponding lowering of the lowered position of that water-distributing spray. The resulting larger hydraulic head will increase the rate at which the hot water will flow out of the openings 68 in that spray. To decrease the rate at which the hot water flows out of the openings 68 in the water-distributing spray 66, the nut 98 can be rotated to raise the initial position of the lever 70 and thus raise the initial position of that spray. This means that by adjusting the setting of the nut 98—which is easily accomplished—the rate at which the hot water is sprayed onto the coffee 132 can be adjusted. Preferably, the hot water will flow out of the openings 68 at the rate of about one-sixth of a gallon per minute; but it can flow out of those openings at the rate of one-half gallon per minute.

The length of the cycle of the timer 100 can easily be adjusted by changing the setting of that timer. A longer cycle permits the catch 108 on the under surface of the latch 106 to lodge within the notch 82 in the disk 80 for a longer period of time before the releasing cam 102 of the timer 100 engages and raises the free end of that latch. A shorter time cycle permits the catch 108 on the under surface of the latch 106 to be raised up out of the notch 82 in the disk 80 after a shorter time interval. This means that the coffee-brewing device provided by the present invention provides a readily adjustable coffee-brewing cycle. By appropriate adjustment of the length of the coffee-brewing cycle, by adjustment of the rate of flow of hot water through the water-distributing spray 66, or by adjustment of both, the user of the coffee-brewing device of the present invention can easily utilize many different grinds and kinds of coffee.

In the event the operator wished to time the cycle of the coffee-brewing device without using the timer 100, she could rotate the knob 78 in the clockwise direction until the notch 82 in the disk 80 moved into register with, and was held by, the catch 108 on the under surface of the latch 106. At such time, the water-distributing spray 66 will have been moved down into water-distributing position, and it will be held in that position by the lodgement of the catch 108 within the notch 82. Thereafter, after any desired length of time selected by the operator, the knob 78 could be rotated in the counter clockwise direction until the L-shaped arm 81 on the shaft 76 engaged the under surface of the latch 106 and raised the free end of that latch upwardly far enough to free the catch 108 from the notch 82. Thereupon, the helical extension spring 92 would raise the water-distributing spray 66 up to its normal position, and thereby prevent the drawing of further hot water from the water-heating tank 36.

The coffee-brewing device of the present invention also makes it possible to draw any desired amounts of hot water from the water-heating tank 36—to make tea, chocolate or the like. To draw hot water from that tank, the funnel 120 will be set in position but will not have a filter or ground coffee in it; and that funnel will act solely as a funnel to collect the hot water from the openings 68 in the water-distributing spray 66 and cause that hot water to pass through the spout 124 into the cup or other receptacle held below that spout. The operator will rotate the knob 78 in the clockwise direction until the catch 108 on the under face of the latch 106 is held by the notch 82 in the disk 80; and the water-distributing spray 66 will be moved into its lowered position as she does so. Then, when the operator wants to shut off the flow of hot water, she will rotate the knob 78 in the counter clockwise direction until the L-shaped arm 81 raises the latch 106 upwardly to permit the disk 80 to rotate in the counter clockwise direction—and at such time the spring 92 will move the water-distributing spray 66 upwardly to shut off any further flow of hot water.

The cross section of the cool water tank 34 is made smaller than the cross section of the water-heating tank 36, and the upper portion of the water-heating tank 36 is made smaller than the cross section of the lower portion of that tank to enable the levels of the water within those tanks to drop quickly whenever hot water is drawn from the water-heating tank 36. If desired, the upper portion of the tank 36 could be given a reduced cross section other than by inclining the upper portion of the front wall of that tank.

As water enters the cool water tank 34, the temperature of that water will usually be below the temperature within the room where the coffee-brewing device is located. Thereupon, the heat in the air within that room will start to heat that water. Also, heat that is radiated from the water-heating tank 36 will tend to heat the water in the tank 34. As a result, less total amount of heat will have to be applied to the water in the water heating tank 36 by the electric heater 110 than would be required if the water directly entered that water-heating tank.

Whereas the drawing and accompanying description have shown and described a preferred embodiment of the present invention it should be apparent to those skilled in the art that various changes may be made in the form of the invention without affecting the scope thereof.

What I claim is:

1. A coffee-brewing device that can brew sizable quantities of coffee and then keep that coffee hot that comprises:
   (a) a base which can receive a container for brewed coffee,
   (b) spaced apart arms that can receive and support a funnel in which a filter and ground coffee can be held,
   (c) a water-heating tank adjacent said spaced arms,
   (d) a cool water tank,
   (e) a conduit extending upwardly through the bottom of said cool water tank and extending upwardly through the bottom of said water-heating tank,
   (f) a float-operated inlet valve that is disposed within said cool water tank and that is connectable to a source of water,
   (g) said float-operated inlet valve substantially maintaining a predetermined level for the water within said cool water tank and hence for the water within said water-heating tank,
   (h) said water-heating tank having a reduced cross section portion adjacent the top thereof to enable the drawing of water from said water-heating tank to quickly lower the level of water therein,
   (i) a heater for water within said water-heating tank,
   (j) a thermostat that controls the energization of said heater and that has a temperature-sensitive bulb disposed within said water-heating tank,
   (k) a water-distributing spray, in the form of an elongated length of flexible tubing, that has one end thereof secured to said water-heating tank in liquid-tight fashion,
   (l) said water-distributing spray having a plurality of spray openings in the lower face thereof that are directed downwardly,
   (m) a removable plug in the free end of said water-distributing spray,
   (n) a support for said water-distributing spray which normally holds said water-distributing spray in a raised position wherein water cannot flow outwardly through the spray openings in said water-distributing spray,
   (o) said support being adapted to be lowered to lower said water-distributing spray to a lowered position wherein water can spray out of said spray openings of said water-distributing spray,
   (p) a rotatable cam that is connected to said support, that has a notch therein, and that carries a mercury switch,
   (q) said rotatable cam being rotatable into a rotated position wherein it holds said support in lowered position,
   (r) a shaft that is rotatable relative to said rotatable cam and that has an arm which can force said rotatable cam to rotate with said shaft,
   (s) a latch with a catch that can seat within said notch in said cam to hold said cam in said rotated position and thereby cause said support to hold said water-distributing spray in its lowered position,
   (t) said arm on said shaft being selectively movable against said latch to lift said catch out of said notch in said rotatable cam and thereby release said rotatable cam to permit said water-distributing spray to move to its normal, raised position,
   (u) a timer connected in series relation with said mercury switch,
   (v) an actuator on said timer that is engageable with said latch to raise the catch on said latch out of said notch in said rotatable cam,
   (w) a funnel that has a handle and that is disposable in position on said spaced apart arms beneath said water-distributing spray,
   (x) said heater and said thermostat coacting to raise the temperature of the water within said water-heating tank to a predetermined level and to substantially maintain that water at that level,
   (y) said shaft being rotatable to lower said water-distributing spray to its lowered position and to cause said mercury switch to energize said timer,
   (z) said timer permitting said water-distributing spray to remain in lowered position, for a predetermined length of time, and then causing said actuator thereof to raise said latch to cause said catch thereon to move out of said notch in said rotatable cam and thereby permit said water-distributing spray to move to is normal raised position,
   (aa) said water-distributing spray spraying hot water onto the ground coffee within said funnel whenever it is in its lowered position, and said float-operated inlet valve causing water to enter said cool water tank as the level of water in the water-heating tank, and hence in said cool water tank, drops,
   (ab) said conduit directing cool water adjacent said temperature-sensitive bulb of said thermostat, and thereby causing said thermostat to quickly energize said electric heater,
   (ac) said funnel having a spout adjacent the bottom thereof which is adjacent said handle for said funnel, so residual brewed coffee in said funnel will flow away from said spout whenever said handle is raised above the level of the rest of said funnel, (ad) said spaced apart arms having projections to force said handle of said funnel to be raised upwardly as said funnel is removed from its position atop said spaced apart arms, (ae) said support bending said water-distributing spray as it moves said water-distributing spray from its lowered position to its raised position, and (af) an adjustment that can adjust the initial, and hence the lowered, position of said water-distributing spray to vary the rate at which hot water is sprayed onto the coffee in said funnel, (ag) said float-operated inlet valve constituting the only water-controlling valve in said coffee-brewing device, (ah) said float-operated inlet valve always keeping said heater immersed in water, (ai) said cool water tank absorbing heat from the air adjacent said coffee-brewing device and also absorbing heat radiated from said water-heating tank.

2. A coffee brewing device that can brew sizable quantities of coffee and that comprises:

(a) a water-heating tank, (b) a cool water tank, (c) a generally U-shaped conduit having the upper end of one arm thereof extending upwardly through the bottom of said cool water tank and having the upper end of the other arm thereof extending upwardly through the bottom of said water-heating tank, (d) the upper end of said other arm of said U-shaped conduit extending approximately one inch above the inner surface of the bottom of said water-heating tank, (e) a float-operated inlet valve that is disposed within said cool water tank and that is connectable to a source of water, (f) said float-operated inlet valve substantially maintaining a predetermined level for the water within said cool water tank and hence for the water within said water-heating tank, (g) said water-heating tank having a reduced cross section portion adjacent the top thereof to enable the drawing of water from said water-heating tank to quickly lower the level of water therein, (h) a submersion-type electric heater disposed within said water-heating tank, and (i) a thermostat that controls the energization of said electric heater and that has a temperature-sensitive bulb disposed within said water-heating tank, (j) said temperature-sensitive bulb of said thermostat being adjacent the upper end of said other arm of said U-shaped conduit, (k) said electric heater and said thermostat coacting to raise the temperature of the water within said water-heating tank to a predetermined level and to substantially maintain that water at that level, (l) said float-operated inlet valve causing water to enter said cool water tank as the level of water in the water-heating tank, and hence in said cool water tank, drops, (m) said U-shaped conduit directing cool water adjacent said temperature-sensitive bulb of said thermostat, and thereby causing said thermostat to quickly energize said electric heater, (n) said float-operated inlet valve constituting the only water-controlling valve in said coffee-brewing device, (o) said float-operated inlet valve always keeping said electric heater immersed in water, (p) said cool water tank absorbing heat from the air adjacent said coffee-brewing device and also absorbing heat radiated from said water-heating tank.

3. A coffee brewing device that can brew sizable quantities of coffee and that comprises:

(a) a water-heating tank, (b) a cool water tank, (c) a conduit having one end thereof extending to and communicating with said cool water tank and having the other end thereof extending to and communicating with said water-heating tank, (d) a level-responsive means connectable to a source of water, (e) said level-responsive means substantially maintaining a predetermined level for the water within said cool water tank, and hence for the water within said water-heating tank, (f) a heater for the water within said water-heating tank, and (g) a thermostat that controls the actuation of said heater and that has a temperature-sensitive bulb disposed within said water-heating tank, (h) said temperature-sensitive bulb of said thermostat being adjacent said other end of said conduit, (i) said heater and said thermostat coacting to raise the temperature of the water within said water-heating tank to a predetermined level and to substantially maintain that water at that level, (j) said level-responsive means causing water to enter said cool water tank as the level of water in the water-heating tank, and hence in said cool water tank, drops, (k) said conduit directing cool water adjacent said temperature-sensitive bulb of said thermostat, and thereby causing said thermostat to quickly actuate said heater, (l) said water-heating tank having the upper portion thereof smaller in cross sectional area than other portions of that tank, whereby the drawing of water from said water-heating tank will quickly lower the level of water in said water-heating tank.

4. A coffee-brewing device that can brew sizable quantities of coffee and that comprises:

(a) a water-heating tank that opens to the atmosphere to maintain the air pressure therein substantially at atmospheric pressure levels, (b) a cool water tank that opens to the atmosphere to maintain the air pressure therein substantially at atmospheric pressure levels, (c) a conduit that interconnects said cool water tank and said water-heating tank and that maintains substantially the same levels of water in said tanks at all times during the operation of said coffee-brewing device, (d) a float-operated inlet valve that is disposed within said cool water tank and that is connectable to a source of water, (e) said float-operated inlet valve substantially maintaining a predetermined level for the water within said cool water tank and hence maintaining a substantially similar level for the water within said water-heating tank, (f) a heater for the water in said water-heating tank, (g) a thermostat that controls said heater and that has a temperature-sensitive element disposed within said water-heating tank, (h) said temperature-sensitive element being adjacent the outlet of said conduit, (i) said heater and said thermostat coacting to raise the temperature of the water within said water-heating tank to a predetermined level and to substantially maintain that water at that level, (j) said float-operated inlet valve causing water to enter said cool water tank as the level of water in the water-heating tank, and hence in said cool water tank, drops, (k) said conduit directing cool water adjacent said temperature-sensitive element of said thermostat, and thereby causing said thermostat to quickly actuate said heater, (l) a water-distributing element that is connected to said water-heating tank and that selectively directs water onto coffee to be brewed by said coffee-brewing device, (m) said float-operated inlet valve introducing water into said cool water tank, as water flows out of said water-heating tank and through said water-distributing element, and thereby substantially maintaining said predetermined level for the water within said cool water and said water-heating tanks.

5. A coffee-brewing device that can brew sizable quantities of coffee and that comprises:

(a) a water-heating tank that opens to the atmosphere to maintain the air pressure therein substantially at atmospheric pressure levels, (b) a cool water tank that opens to the atmosphere to maintain the air pressure therein substantially at atmospheric pressure levels, (c) a conduit that interconnects said cool water tank and said water-heating tank and that maintains substantially the same levels of water in said tanks at all times during the operation of said coffee-brewing device, (d) a float-operated inlet valve that is disposed within said cool water tank and that is connectable to a source of water, (e) said float-operated inlet valve substantially maintaining a predetermined level for the water within said cool water tank and hence maintaining a substantially similar level for the water within said water-heating tank, (f) a heater for the water in said water-heating tank, (g) a thermostat that controls said heater, (h) said heater and said thermostat coacting to raise the temperature of the water within said water-heating tank to a predetermined level and to substantially maintain that water at that level, (i) said float-operated inlet valve causing water to enter said cool water tank as the level of water in the water-heating tank, and hence in said cool water tank, drops, and (j) a water-distributing element that is connected to said water-heating tank and that selectively directs water onto coffee to be brewed by said coffee-brewing device, (k) said float-operated inlet valve introducing water into said cool water tank, as water flows out of said water-heating tank and through said water-distributing element, and thereby substantially maintaining said predetermined level for the water within said cool water and said water-heating tanks.

6. A coffee brewing device that comprises:

(a) a water-heating tank that opens to the atmosphere to maintain the air pressure therein substantially at atmospheric pressure levels, (b) a cool water tank that opens to the atmosphere to maintain the air pressure therein substantially at atmospheric pressure levels, and that is in communication with said water-heating tank to permit water to flow from said cool water tank into said water-heating tank and to have a water level substantially equal to the water level in said cool water tank, (c) level-responsive means to control the introduction of water into said cool water tank and to substantially maintain a predetermined water level in said cool water tank and thus to maintain said substantially equal water level in said water-heating tank, (d) a heater for the water in said water-heating tank, (e) said heater raising the temperature of the water within said water heating tank and thereby tending to cause said water to vaporize, (f) said water level which said level-responsive means substantially maintains in said cool water tank being above the top of said heater whereby said level-responsive means always maintains said heater immersed in water and thereby keeps said heater from burning out, and (g) a water-distributing element that is connected to said water-heating tank and that selectively directs water onto coffee to be brewed by said coffee brewing device, (h) said level-responsive means introducing water into said cool water tank, as water flows out of said water-heating tank and through said water-distributing element, and thereby substantially maintaining said predetermined water level in said cool water tank and maintaining said substantially equal water level in said water-heating tank.

7. A coffee-brewing device that comprises:

(a) a water-heating tank that can hold water therein and that opens to the atmosphere to maintain the air pressure therein substantially at atmospheric pressure levels, (b) level-responsive means connectable to a water line to control the introduction of water into said water-heating tank and to maintain the level of water within said water-heating tank substantially at a predetermined value, and (c) a water-distributing spray connected to said water-heating tank to receive water from said water-heating tank and to spray said water onto ground coffee, (d) said level-responsive means controlling the introduction of water into said water-heating tank and said water-distributing spray controlling the flow of water out of said water-heating tank, (e) said level-responsive means and said water-distributing spray coacting to provide a substantially constant rate of flow for the water sprayed onto said coffee, irrespective of variations in the pressure in the water line to which said level-responsive means is connectable, (f) said water-distributing spray being located below the level of said level of water in said water-heating tank, whereby water will flow from said water-heating tank into and through said water-distributing spray under the action of gravity.

8. A coffee brewing device that comprises:

(a) a water-heating tank that opens to the atmosphere to maintain the air pressure therein substantially at atmospheric pressure levels, (b) a cool water tank that opens to the atmosphere to maintain the air pressure therein substantially at atmospheric pressure levels, (c) level-responsive means to control the introduction of water into said cool water tank and to substantially maintain a predetermined water level in said cool water tank and thus to maintain said substantially equal water level in said water-heating tank, (d) a heater for the water in said water-heating tank, (e) said cool water tank being in communication with said water-heating tank to permit water to flow from said cool water tank into said water-heating tank and to have a water level in said water-heating tank throughout the operation of said coffee-brewing device that is substantially equal to the water level in said cool water tank, (f) said heater raising the temperature of the water within said water heating tank, (g) said cool water tank and the cool water therein isolating said level-responsive means from the hot water in said water-heating tank, and thereby keeping said level-responsive means from "liming" up, and (h) a water-distributing element that is connected to said water-heating tank and that selectively directs water onto coffee to be brewed by said coffee-brewing device, (i) said level-responsive means introducing water into said cool water tank, as water flows out of said water-heating tank and through said water-distributing element, and thereby substantially maintaining said predetermined water level in said cool water tank and maintaining said substantially equal water level in said water-heating tank.

9. A coffee-brewing device that comprises:
(a) a water-heating tank that opens to the atmosphere to maintain the air pressure therein substantially at atmospheric pressure levels,
(b) a cool water tank that opens to the atmosphere to maintain the air pressure therein substantially at atmospheric pressure levels,
(c) level-responsive means to control the introduction of water into said cool water tank and to substantially maintain a predetermined water level in said cool water tank,
(d) a heater for the water in said water-heating tank,
(e) said cool water tank being in communication with said water-heating tank to permit water to flow from said cool water tank into said water-heating tank and to maintain a water level in said water-heating tank throughout the operation of said coffee-brewing device that is substantially equal to the water level in said cool water tank,
(f) said heater raising the temperature of the water within said water-heating tank, and
(g) a water-distributing element that is connected to said water-heating tank and that selectively directs water onto coffee to be brewed by said coffee-brewing device,
(h) said water-heating tank having a reduced cross section portion adjacent the top thereof to enable the flow of water from said water-heating tank to and through said water distributing element to quickly lower the level of the water therein and thereby also quickly lower the level of water in said cool water tank,
(i) whereby said level-responsive means can quickly introduce further water into said cool water tank to substantially maintain said predetermined water level in said cool water tank and said substantially equal water level in said water-heating tank.

10. A coffee-brewing device that comprises:
(a) a water-heating tank that opens to the atmosphere to maintain the air pressure therein substantially at atmospheric pressure levels,
(b) a cool water tank that opens to the atmosphere to maintain the air pressure therein substantially at atmospheric pressure levels,
(c) level-responsive means to control the introduction of water into said cool water tank and to substantially maintain a predetermined water level in said cool water tank,
(d) a heater for the water in said water-heating tank,
(e) said cool water tank being in communication with said water-heating tank to permit water to flow from said cool water tank into said water-heating tank and to maintain a water level in said water-heating tank throughout the operation of said coffee-brewing device that is substantially equal to the water level in said cool water tank,
(f) said heater raising the temperature of the water within said water-heating tank, and
(g) a water-distributing element that is connected to said water-heating tank and that selectively directs water onto coffee to be brewed by said coffee-brewing device,
(h) said cool water tank being immediately adjacent, and exposed to, said water-heating tank,
(i) whereby said cool water tank absorbs heat from the air adjacent said coffee-brewing device and also absorbs heat radiated from said water-heated tank.

11. A coffee-brewing device that comprises:
(a) a water-heating tank that opens to the atmosphere to maintain the air pressure therein substantially at atmospheric pressure levels,
(b) a cool water tank that opens to the atmosphere to maintain the air pressure therein substantially at atmospheric pressure levels,
(c) level-responsive means to control the introduction of water into said cool water tank and to substantially maintain a predetermined water level in said cool water tank,
(d) a heater for the water in said water-heating tank,
(e) said cool water tank being in communication with said water-heating tank to permit water to flow from said cool water tank into said water-heating tank and to maintain a water level in said water-heating tank throughout the operation of said coffee-brewing device that is substantially equal to the water level in said cool water tank,
(f) said heater raising the temperature of the water within said water-heating tank, and
(g) a water-distributing element that is connected to said water-heating tank and that selectively directs water onto coffee to be brewed by said coffee-brewing device,
(h) said level-responsive means including a float-operated inlet valve,
(i) said float-operated inlet valve constituting the only water-controlling valve in said coffee-brewing device,
(j) said cool water tank and the cool water therein isolating said float operated inlet valve from the hot water in said water-heating tank, and thereby keeping said float-operated inlet valve from "liming" up.

12. A coffee-brewing device that comprises:
(a) a water-heating tank that opens to the atmosphere to maintain the air pressure therein substantially at atmospheric pressure levels,
(b) a cool water tank that opens to the atmosphere to maintain the air pressure therein substantially at atmospheric pressure levels,
(c) level-responsive means to control the introduction of water into said cool water tank and to substantially maintain a predetermined water level in said cool water tank,
(d) a heater for the water in said water-heating tank,
(e) said cool water tank being in communication with said water-heating tank to permit water to flow from said cool water tank into said water-heating tank and to maintain a water level in said water-heating tank throughout the operation of said coffee-brewing device that is substantially equal to the water level in said cool water tank,
(f) said heater raising the temperature of the water within said water-heating tank, and
(g) a water-distributing spray that is connected to said water-heating tank adjacent the top of said water-heating tank but below said water level in said water-heating tank, and that is adapted to spray hot water onto ground coffee,
(h) said water-distributing spray coacting with said water level in said water-heating tank to maintain a closely controlled hydraulic head on the water issuing from said water-distributing spray,
(i) the connecting of said water-distributing spray to said water-heating tank adjacent the top of said water-heating tank enabling said water-distributing spray to receive the hot water in said water-heating tank.

13. A coffee-brewing device that comprises:
(a) a water-heating tank that opens to the atmosphere to maintain the air pressure therein substantially at atmospheric pressure levels,
(b) a cool water tank that opens to the atmosphere to maintain the air pressure therein substantially at atmospheric pressure levels,
(c) level-responsive means to control the introduction of water into said cool water tank and to substantially maintain a predetermined water level in said cool water tank,
(d) said cool water tank being in communication with said water-heating tank to permit water to flow from said cool water tank into said water heating tank and to maintain a water level in said water-heating tank throughout the operation of said coffee-brewing device that is substantially equal to the water level in said cool water tank,
(e) a heater for the water in said water-heating tank, and
(f) a water-distributing element that is connected to said water-heating tank and that selectively directs water onto coffee to be brewed by said coffee-brewing device,
(g) said water-heating tank having a reduced cross section portion adjacent the top thereof to enable the flow of water from said water-heating tank to and through said water-distributing element to quickly lower the level of the water therein,
(h) said cool water tank being smaller than said water-heating tank so the total amount of water, that must flow out of said water-heating tank and through said water-distributing element before said level-responsive means can start introducing further water into said cool water tank, is small,
(i) whereby said level-responsive means can quickly start introducing said further water into said cool water tank to substantially maintain said predetermined water level in said cool water tank and said substantially equal water level in said water-heating tank.

References Cited
UNITED STATES PATENTS

| | | | |
|---|---|---|---|
| 2,482,964 | 9/1949 | Cohee | 126—113 |
| 2,551,219 | 5/1951 | Peters et al. | 99—282 |
| 2,814,529 | 11/1957 | Arnt | 239—450 X |
| 2,900,894 | 8/1959 | Tritt | 99—283 |
| 2,949,212 | 8/1960 | Watson | 222—457 X |
| 3,053,168 | 9/1962 | Mills | 99—289 |
| 3,074,340 | 1/1963 | Walton | 99—283 |
| 3,240,205 | 3/1966 | Helland | 126—113 |

WILLIAM I. PRICE, *Primary Examiner.*